C. KLEIN.
FENDER.
APPLICATION FILED APR. 8, 1913.
1,093,785.
Patented Apr. 21, 1914.
3 SHEETS—SHEET 1.
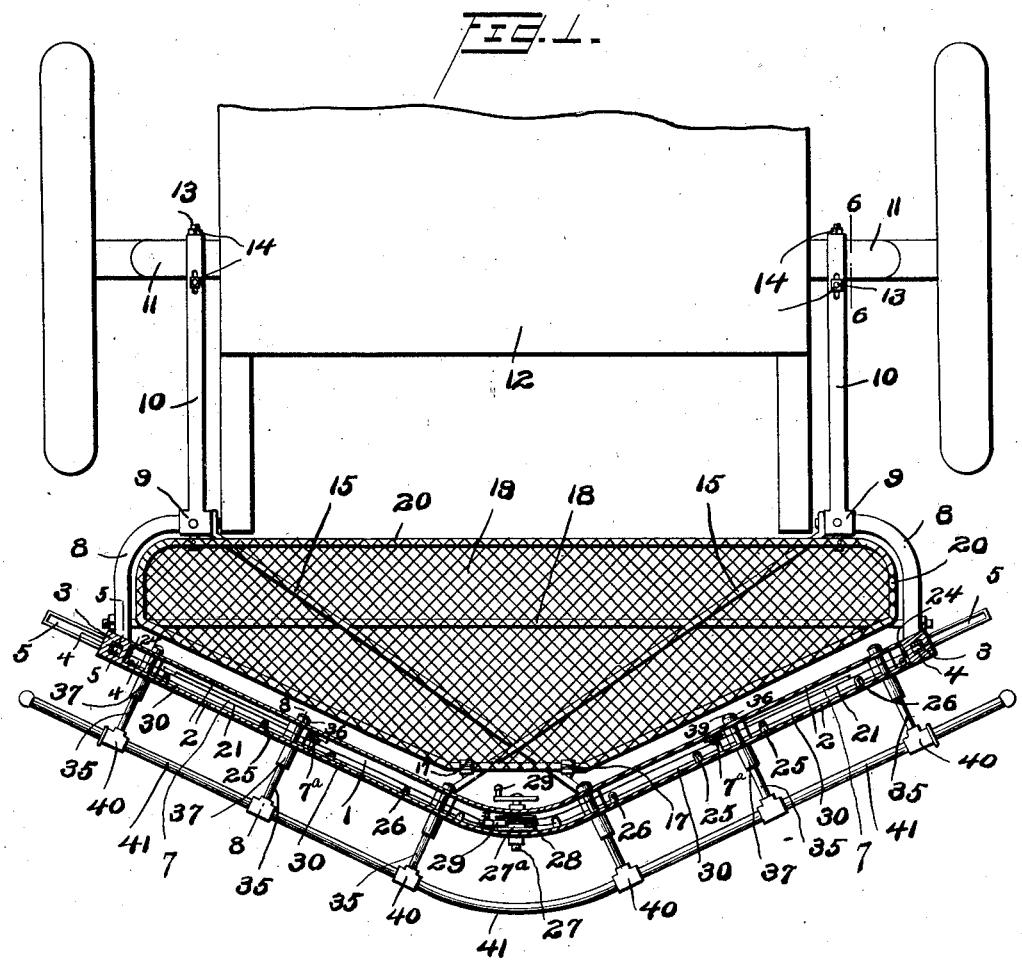
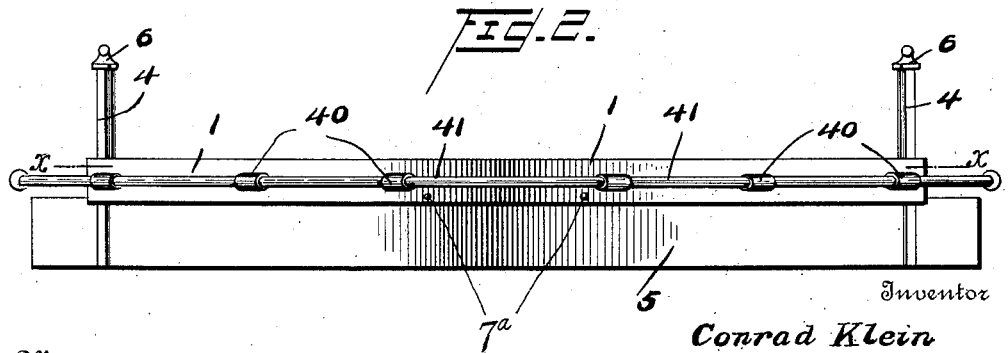
Witnesses
H. Strauss
C. R. Ziegler.
Inventor
Conrad Klein
By Joshua R. H. Potts.
Attorney C. KLEIN.
FENDER.
APPLICATION FILED APR. 8, 1913.
1,093,785.
Patented Apr. 21, 1914.
3 SHEETS—SHEET 2.
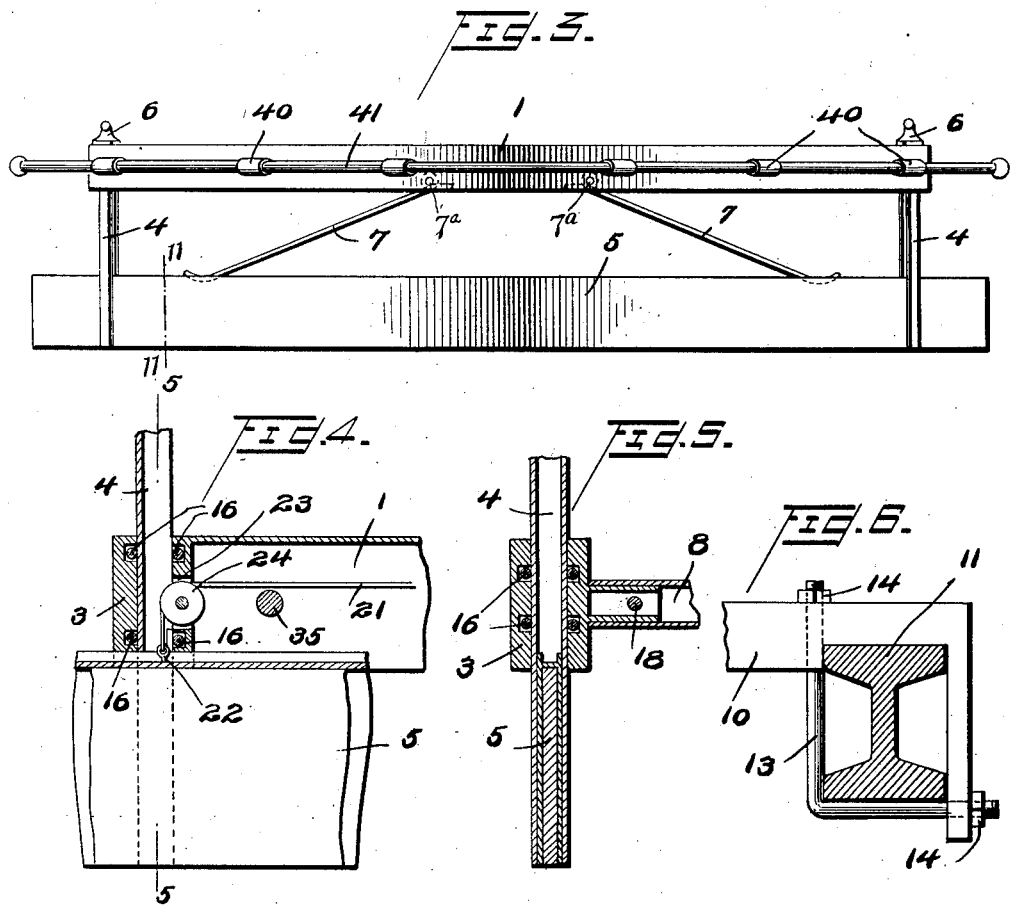
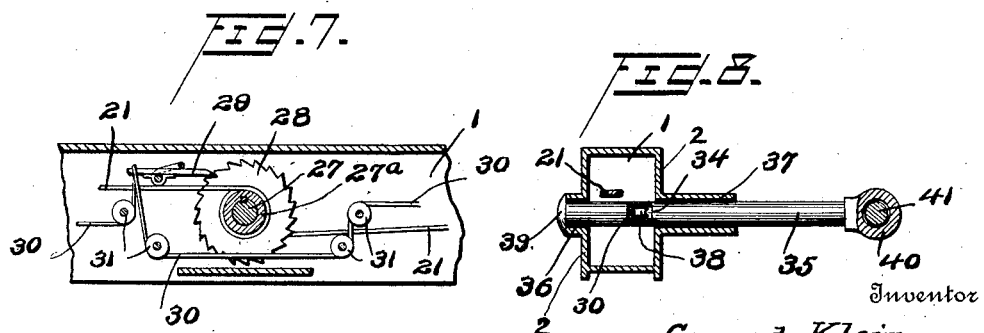
Witnesses
H. Strauss
C. R. Ziegler.
Inventor
Conrad Klein
By Joshua R. H. Potts.
Attorney C. KLEIN.
FENDER.
APPLICATION FILED APR. 8, 1913.
1,093,785.
Patented Apr. 21, 1914.
3 SHEETS—SHEET 3.
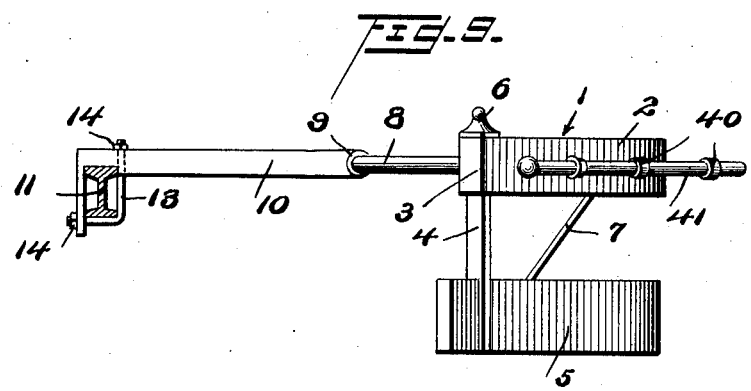
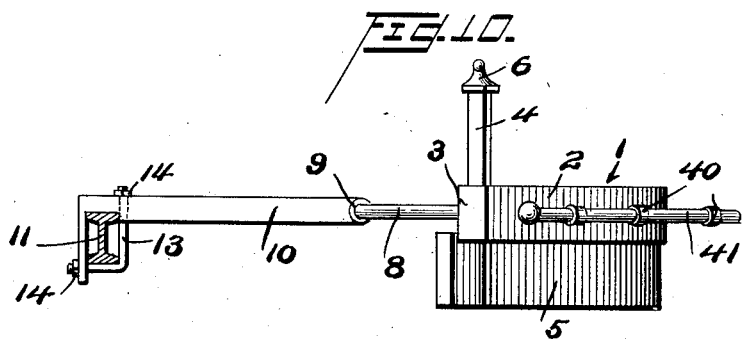
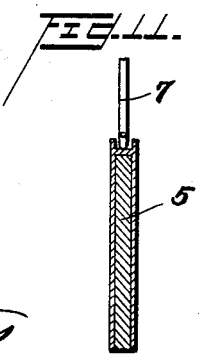
WITNESSES:
Harold Strauss
C. R. Ziegler.
INVENTOR
Conrad Klein
BY
Joshua R. H. Potts.
ATTORNEY

UNITED STATES PATENT OFFICE.

CONRAD KLEIN, OF PHILADELPHIA, PENNSYLVANIA.

FENDER.

1,093,785. Specification of Letters Patent. Patented Apr. 21, 1914.

Application filed April 8, 1913. Serial No. 759,820.

*To all whom it may concern:*

Be it known that I, CONRAD KLEIN, a citizen of the United States, residing at Philadelphia, in the county of Philadelphia and State of Pennsylvania, have invented certain new and useful Improvements in Fenders, of which the following is a specification.

My invention relates to improvements in fenders, and more particularly to an improved fender designed for use on automobiles and similar vehicles, the object of the invention being to provide a normally elevated fender which is released and permitted to lower when the bumper engages a person or object.

A further object is to provide an improved fender which may be attached to any ordinary vehicle, and which may be folded to occupy but small space when not in use.

With these and other objects in view, the invention consists in certain novel features of construction and combinations and arrangement of parts as will be more fully hereinafter described and pointed out in the claims.

In the accompanying drawings: Figure 1 is a view in plan illustrating my improvements showing the front portion of an automobile with which the fender is connected and a horizontal section of the latter taken along the line X—X of Fig. 2. Fig. 2 is a front elevation of the fender without showing any attaching means. Fig. 3 is a view similar to Fig. 2 showing the fender in its lowered position. Fig. 4 is a fragmentary view on an enlarged scale in longitudinal section on the line 4—4 of Fig. 1. Fig. 5 is a view in section on the line 5—5 of Fig. 4. Fig. 6 is a view in section on the line 6—6 of Fig. 1. Fig. 7 is a view in longitudinal section on an enlarged scale through the center of the fender supporting bar illustrating the ratchet wheel and its controlling means. Fig. 8 is a view in section on an enlarged scale on the line 8—8 of Fig. 1. Fig. 9 is a view in side elevation illustrating the fender in lowered position. Fig. 10 is a similar view showing the fender in elevated position, and Fig. 11 is a view in vertical section on an enlarged scale through the fender bar 5 along the line 11—11 of Fig. 3.

1 represents a hollow bar which may be variously formed for strength and durability and which has parallel front and rear plates 2, 2, fixed to or integral with rectangular sleeves 3 forming guides at the ends of the bar. The bar 1 is bent centrally between its ends, so that it projects forwardly at the center and gradually inclines rearwardly from its center to its ends.

In the rectangular sleeves 3, channel iron posts 4 are mounted to move vertically, and at their lower ends are secured to a fender bar 5. Enlargements 6 on the upper end of the posts 4 limit the downward movement of the posts in the sleeves 3, and springs 7 are coiled around pins 7ª in the bar 1. These springs at their shorter ends bear against the lower surface of the bar 1 and bear at their free ends on top of fender bar 5 to assist gravity in lowering the fender bar 5.

It will be noted that the lower face of bar 1, and the upper face of bar 5 are grooved, so that the springs 7 are effectually housed when the fender bar 5 is in its elevated position, as seen most clearly in Fig. 2. The bar 1, at its ends, is secured to curved arms 8, and the latter have rotary mounting in sleeves 9 at the ends of forwardly projecting bars 10. These bars 10 are secured to the front axle 11 of the vehicle 12 by means of angle bolts 13 and nuts 14, as clearly shown in Fig. 6.

The journaled ends of the arms 8 are connected with the intermediate portion of the bar 1 by braces 15. A horizontal rod 18 also connects the arms 8, and this rod 18 and the braces 15 constitute a support for a horizontal frame 20 containing a netting 19. This netting 19 acts to support a person falling over the top of the bar 1, and the frame 20 has a hinge mounting 17, on the braces 15, to allow the frame to be swung to a vertical position whenever desired.

By reference particularly to Figs. 4, and 5, it will be seen that the posts 4 are provided on all four sides with roller bearings 16 which reduce friction to a minimum and allow free vertical movement in the sleeves 3. Straps 21 are secured to eyes 22 on the fender bar 5 near the ends of the latter, and are passed over pulleys 24 located in openings 23 in the inner walls of the sleeves 3. These straps 21 are secured to drums 27ª at opposite sides of a ratchet wheel 28, said drums and ratchet wheel being keyed to turn with a short shaft 27 horizontally disposed and mounted in the bar 1 at the center thereof. This shaft 27 projects rearwardly through the bar 1, and is provided with a crank 29 at its rear end to turn the same. It will be noted that the straps 21 extending from opposite ends of the bar 1 are wound reversely on their respective drums, so that the turning of the shaft 27 tends to wind both of said straps in a direction to elevate the fender bar 5. The ratchet wheel 28 is engaged by a spring-pressed pawl 29 which is connected to ropes 30. These ropes 30 project in opposite directions from the pawl 29, and are passed over pulleys 31, and at their ends are secured to the ends of the bar 1. These ropes 30 are also positioned in front of pulleys 26 supported in brackets 25 secured to the front plate of the bar 1, and the said ropes 31 also project through openings 34 in rods 35 extending through registering guide sleeves 36 and 37 on the rear and front faces, respectively, of the bar 1. The pulleys 38 are mounted in the openings 34 to reduce wear on the ropes 30, and the forward movement of the rods 35 is limited by heads 39 on the rear ends of said rods, as is clearly shown in Fig. 8. On the forward ends of the rods 35, T-couplings 40 are secured, and in these T-couplings 40, a bumper rod 41 is loosely mounted, so that the bumper rod has longitudinal movement in the T-couplings 40 to compensate for the varying movement of the latter, as the rods 35 are moved rearwardly. In other words, it will be noted that the rod 41 conforms in general shape to the shape of the bar 1, and that the rods 35 are at right angles to rod 41, so that they are at an angle to the line of draft of the machine, hence when the rod 41 is moved rearwardly, the several rods 35 will be moved angularly with relation thereto, and a movement of rod 41 in the T-couplings 40 is necessary to compensate for this difference in movement. When the shaft 27 is turned in one direction, it will cause the straps 21 to wind on the drums 27ᵃ and elevate the fender bar 5 to the position shown in Fig. 2, the pawl 29 holding the same in this elevated position. When the bumper 41 engages a person or object, the rods 35 will be moved rearwardly, exerting a pull on the ropes 30 to release the pawl 29 whereupon the springs 7, assisted by gravity, will move the bar 5 downwardly into position to strike the person or object and deflect it or them to one side. The enlargements 6 limit the downward movement of bar 5, and it is the intention of the inventor to stop the bar 5 a few notches above the surface of the pavement.

When not in use, the fender may be folded by swinging the same upwardly and rearwardly, the sleeves 9 acting as bearings in which the arms 8 turn. If the person struck falls over the top of the bar 1, he will be deposited upon the netting 19 and supported until the machine can be brought to a stop.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a hollow bar having guides therein, vertical posts movable in the guides, enlargements on the upper ends of the posts limiting their movement through the bar, a fender bar secured to the lower ends of the posts, means within the hollow bar normally holding the fender bar in elevated position, and springs between the bars adapted to force the fender bar downwardly when permitted by said holding means, substantially as described.

2. The combination with a hollow bar having guides therein, vertical posts movable in the guides, enlargements on the upper ends of the posts limiting their movement through the bar, a fender bar secured to the lower ends of the posts, means in the first-mentioned bar for holding elevated the fender bar, a bumper adapted to release said means and permit the fender bar to fall, means within the hollow bar normally holding the fender bar in elevated position, and springs between the bars adapted to force the fender bar downwardly when permitted by said holding means, substantially as described.

3. The combination with a bar having guides therein, vertical posts movable in the guides, enlargements on the upper ends of the posts limiting their movement through the bar, a fender bar secured to the lower ends of the posts, means in the first-mentioned bar for holding elevated the fender bar, a bumper adapted to release said means and permit the fender bar to fall, said first-mentioned bar having a grooved lower face, said fender bar having a grooved upper face, and springs secured to the upper bar and engaging the lower bar, and housed within the grooves of said bars when the lower bar is elevated, substantially as described.

4. The combination with a hollow bar, and guides in the ends of said hollow bar, of posts movable in said guides, means on the posts limiting their downward movement, a fender bar secured to said posts below the first-mentioned bars, springs exerting downward pressure on the fender bar, a shaft supported in the first-mentioned bar, flexible devices connecting the shaft with the fender bar, means for turning the shaft to wind the flexible devices and elevate the fender bar, a ratchet wheel secured to turn with the shaft, a pawl controlling the ratchet wheel, and a bumper controlling the releasing pawl, substantially as described.

5. The combination with a hollow bar, and guides in the ends of said hollow bar, of posts movable in said guides, means on the posts limiting their downward movement, a fender bar secured to said posts below the first-mentioned bars, springs exerting downward pressure on the fender bar, a shaft supported in the first-mentioned bar, flexible devices connecting the shaft with the fender bar, means for turning the shaft to wind the flexible devices and elevate the fender bar, a ratchet wheel secured to turn with the shaft, a pawl controlling the ratchet wheel, rods movable through the first-mentioned bar, said rods having openings therein, flexible devices connected to the pawl and extending through said openings, and a bumper connected to and adapted to move said rods, substantially as described.

6. The combination with a hollow bar, and guides in the ends of said hollow bar, of posts movable in said guides, means on the posts limiting their downward movement, a fender bar secured to said posts below the first-mentioned bars, springs exerting downward pressure on the fender bar, a shaft supported in the first-mentioned bar, flexible devices connecting the shaft with the fender bar, means for turning the shaft to wind the flexible devices and elevate the fender bar, a ratchet wheel secured to turn with the shaft, a pawl controlling the ratchet wheel, rods movable through the first-mentioned bar, said rods having openings therein, flexible devices connected to the pawl and extending through said openings, T-couplings on the outer ends of said rods, and a bumper bar movably mounted in said T-couplings, substantially as described.

7. The combination with a hollow bar, and guides in the ends of said hollow bar, of posts movable in said guides, means on the posts limiting their downward movement, a fender bar secured to said posts below the first-mentioned bars, springs exerting downward pressure on the fender bar, a shaft supported in the first-mentioned bar, flexible devices connecting the shaft with the fender bar, means for turning the shaft to wind the flexible devices and elevate the fender bar, a ratchet wheel secured to turn with the shaft, a pawl controlling the ratchet wheel, a bumper controlling the releasing pawl, bars adapted to be secured to a vehicle axle and having sleeves at their forward ends, arms fixed to the first-mentioned bar and mounted to turn in the sleeves, rods connecting said arms with the first-mentioned bar, and a frame supported on said last-mentioned rods, substantially as described.

In testimony whereof I have signed my name to this specification in the presence of two subscribing witnesses.

CONRAD KLEIN.

Witnesses:
 C. R. ZIEGLER,
 CHAS. E. POTTS.

Copies of this patent may be obtained for five cents each, by addressing the "Commissioner of Patents, Washington, D. C."